Oct. 16, 1962  H. PROHASKA ET AL  3,058,654
MAGNETIC SPEEDOMETER
Filed Jan. 12, 1959
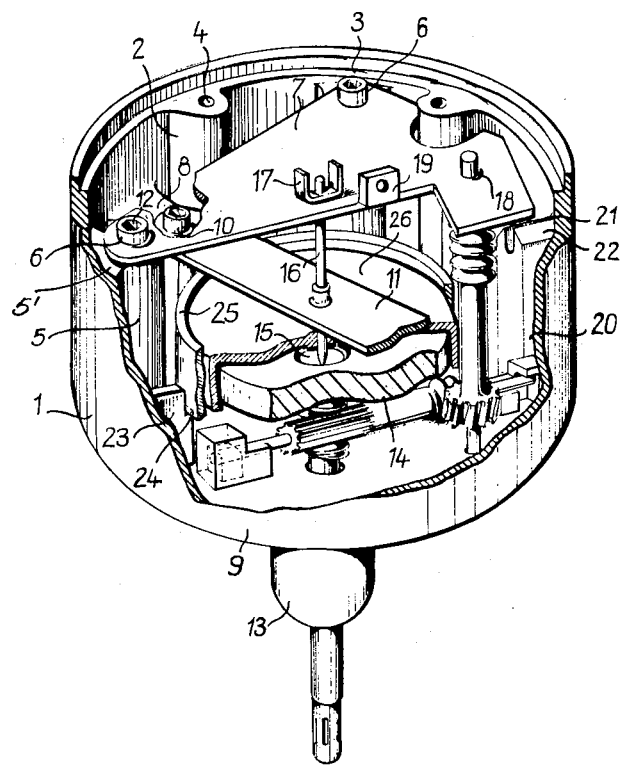
INVENTORS
HANS PROHASKA
WILLY BOCK
BY Dicke and Craig
ATTORNEYS

3,058,654
MAGNETIC SPEEDOMETER
Hans Prohaska and Willy Bock, Bietigheim, Wurttemberg, Germany, assignors to SWF-Spezialfabrik für Autozubehör Gustav Rau G.m.b.H., Bietigheim, Wurttemberg, Germany
Filed Jan. 12, 1959, Ser. No. 786,413
Claims priority, application Germany Jan. 18, 1958
8 Claims. (Cl. 235—96)

The present invention relates to a magnetic speedometer for motor vehicles, and more particularly to a die-cast housing for such a speedometer.

The accuracy of the operation and indication of such an instrument depends upon the accuracy at which the bell-shaped oscillatory member thereof is centered relative to the permanent magnet which is driven by the shaft the speed of which is to be measured.

Prior to this invention, such centering of the bell-shaped oscillatory member and of the indicator spindle carrying the same required a very difficult adjustment. In order to facilitate this work and to permit an easier mass production of such speedometers on an assembly line, it has been proposed first to assemble the sensitive parts of the instrument so as to form a unit, then to connect this unit to the drive shaft of the instrument which carries the permanent magnet, and either at the same time or subsequently thereto to insert and mount the entire mechanism within a housing. Thus, for example, in one particular known embodiment of such a speedometer, the drive shaft carrying the permanent magnet was rotatably mounted within the instrument housing and provided with a central bore into which a bushing was then inserted which supported one end of the instrument spindle carrying the pointer and the bell-shaped oscillatory member. This spindle extended through and was rotatably mounted on a bearing plate which, in turn, was secured within the housing. In assembling the mechanism, it was absolutely necessary to carry out at least one very delicate adjustment in order to secure the bearing plate in the proper position within the housing in which the spindle bearings would be in perfect alignment with each other so that the bell-shaped oscillatory member would run exactly concentrically with the permanent magnet on the drive shaft. However, because of the complicated construction of the entire mechanism, it was practically impossible to carry out such an adjustment with the required accuracy.

Another known arrangement provided separate elements for mounting the drive shaft carrying the permanent magnet and the indicator spindle carrying the pointer and the bell-shaped oscillatory member. These separate mounting elements were subsequently connected to each other and then inserted into a housing. Apart from the fact that it is always very difficult to align two individually mounted rotary elements at an extreme accuracy with each other, such alignment was in this case further endangered by the final assembly in the housing. Furthermore, this as well as the previous instrument mentioned above had the disadvantage, which is especially prevalent in a mass production, that the sensitive instrument parts were assembled without being immediately protected by a solid housing. Consequently, it frequently occurred that these delicate parts were damaged even before they were finally assembled in the housing. Since even the slightest amount of eccentricity between the permanent magnet and the bell-shaped oscillatory member of a speedometer results in inaccurate or at least strongly fluctuating indications, these known instruments, apart from being rather expensive, have not proved satisfactory.

According to a further known speedometer construction the housing into which the various parts of the instrument were individually installed merely consisted of an open frame with a bottom wall with solid arms projecting therefrom on which the dial was mounted. The bottom wall carried a flange integrally thereon which served as a bearing of the drive shaft. The bottom wall also carried supporting studs on which the bearing plates were mounted which rotatably supported the indicator spindle carrying the pointer and the bell-shaped oscillatory member. This speedometer construction has also proved to be very unsatisfactory since it was practically impossible to center the bearing plates of the spindle accurately relative to the drive shaft with the permanent magnet thereon inasmuch as screw holes in the bearing plates and supporting studs cannot be drilled with sufficient accuracy and the holes in the bearing plates have to be made so large that the plates may be shifted to permit at least some sort of adjustment before they are finally screwed down tightly. Furthermore, since the frame supporting the instrument had to be open toward the sides to permit an assembly of its parts therein, this instrument was also easily damaged before it was finally installed in its housing.

It is the object of the present invention to overcome the deficiencies of the prior speedometer constructions by providing a die-cast housing which may be easily produced at an extreme accuracy and in which the various points for securing the bearing plates of the instrument spindle and for directly mounting the odometer train and the reflux ring are located in an exact predetermined position relative to the bearing of the drive shaft so that all the parts of the instrument may be individually installed directly in the housing without requiring any subsequent adjustments.

According to one preferred embodiment of the invention, this object may be attained by a die-cast housing which is especially adpated to be easily and accurately cast and in which the various parts of the instrument may be very easily installed and precisely seated in their proper relation to each other in each of three different dimensions of the housing. This housing is provided with suitable supporting seats such as webs, ribs or the like on which the various parts of the instrument may be mounted in the exact finally required position by the provision in or on these webs or ribs of centering studs, notches, recesses, and apertures. These webs or ribs are made in the shape of columns which are integral with the bottom and side wall of the housing and extend upwardly from the bottom, and are disposed in a staggered relation to each other with their supporting surfaces being at different levels in accordance with the desired location of the respective parts.

These and other objects, features, and advantages of the present invention will become further apparent from the following detailed description thereof, particularly when read with reference to the accompanying drawing which shows a perspective view of a preferred embodiment of the invention.

The die-cast housing according to the invention consists of a cylindrical wall portion 1 with columnar supporting ribs 2 extending upwardly from the bottom 9 integrally with the latter and with the wall 1. Ribs 2 terminate in a common plane at an upper edge combining the same and form with said edge a supporting surface for the circular dial of the speedometer, not shown. Supporting ribs 2 are provided with bores 4 for screw threads for securing the dial which does not need to be more accurately centered. Additional columnar supporting ribs 5 integral with the cylindrical wall portion 1 and with bottom 9 terminate at their upper ends in supporting surfaces 5' which likewise lie within a common plane. Each of these ribs has a short stud 6 upwardly projecting from the supporting surface 5'. These studs 6 are cast so as to be positioned at very accurate points, particularly insofar as their distances relative to each other are concerned. They serve to support and accurately position complementary abutting surfaces of a bearing plate 7 which for this purpose is provided with suitable apertures to fit tightly over studs 6. A pair of additional columnar supporting ribs 8 integral with wall portion 1 and bottom 9 of the housing and located at diametrically opposite points therein terminate at a lower level than ribs 2 and 5. Their upper supporting surfaces are likewise provided with short studs 10 for supporting and accurately centering a bearing plate 11, the corresponding apertures of which are fitted tightly over these studs 10. Only one of the ribs 8 is shown in the drawing FIGURE in order to permit a cut-away view of the structure. The omitted rib is diametrically opposed to the shown rib. Ribs 5 and 8 have vertical, cast-in holes therein which at least within the locating studs 6 and 10 are made of an angular shape in order to permit the upper edge portions to be more easily bent outwardly after bearing plates 7 and 11 are fitted thereon so as to secure these plates in a fixed position. In the event that the speedometer mechanism in the housing has to be replaced, the bent-over edges of holes 12 may be removed to permit bearing plates 7 and 11 to be lifted from studs 6 and 10, and screw threads may then be cut into these holes 12 to permit the bearing plates to be secured by screws.

The bottom 9 of the housing carries a flange 13 which is likewise integral with the housing and forms a bushing for rotatably supporting a drive shaft which carries at its upper end a cylindrical magnet 14 as well as a central thrust bearing 15 which supports a spindle 16. This spindle passes through a suitable aperture in the plate 11 through a bearing aperture in plate 7 and carries above plate 7 a bracket 17 on which a return spring, not shown, is adapted to engage, the outer end of which is secured to a projection 19 on plate 7. On its upper end, not shown in the drawing, and above the dial which is mounted on supporting ribs 2, spindle 16 also carries an instrument pointer. Bearing plate 7 is further provided with an aperture 18 for supporting a vertical worm spindle, the lower end of which is mounted in a step bearing, which is located on or in bottom 9 coaxially with an underneath aperture 18 in bearing plate 7. This spindle is adapted to be driven by the drive shaft carrying magnet 14 through an intermediate worm gearing and, in turn, drives the odometer train, not shown. This odometer train is not mounted in the customary manner in a separate supporting bracket, but directly in supporting ribs 20 which are cast integrally with the housing and have a recess 21 therein each forming a bearing section which serves to support the drive shaft of the number rolls of the odometer train. After the drive shaft of the odometer train has been inserted into these bearing sections 21, the upper edges 22 thereof are adapted to be bent over the drive shaft to secure the latter rotatably within the bearings.

The housing wall 1 is further provided with supporting ribs 23 which are disposed in an offset relation to the other ribs previously mentioned. These ribs 23 are provided with notched portions 24 into which a magnetic reflux ring 25 is mounted so as to be exactly centrally disposed within the housing. After the ring has been inserted and clamped down by plate 11, the inner edges of the notched portions 24 may be pressed upwardly and against the inner surface of ring 25 to secure the ring in a fixed position.

The bell-shaped oscillatory member 26 of the instrument which is secured to spindle 16 must be disposed in an exact central position in the annular aperture between magnet 14 and reflux ring 25 in order to attain accurate indications of the instrument. This is fully attained by the accurate arrangement of the parts which are secured in a fixed position relative to each other by the supporting ribs and bearing plates so that magnet 14 and reflux ring 25 will at all times be exactly concentrical with the bell-shaped reciprocatory member 26 on spindle 16.

Due to the accurate location of bearing plates 7 and 11, plate 11 may also be used for centrally supporting spindle 16 either additionally to thrust bearing 15 in magnet 26 or in place thereof.

The new manner of mounting the various parts of a speedometer within a die-cast housing so that all of the mounting surfaces, apertures, and recesses are disposed in such accurate positions relative to each other that the various parts of the instrument and particularly the indicator spindle with the bell-shaped oscillatory member thereon and the revolving magnet on the drive shaft will not require any adjustment after being installed in the housing, renders the instrument much more accurate than the instruments previously known, and considerably reduces the cost of manufacture thereof, and also renders the individual parts of the instrument much less susceptible to damage during the assembly since they are immediately installed within the housing in their final required position and are thus immediately protected by the solid housing.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. In a magnetic speedometer for motor vehicles having a rotatable drive shaft with a magnet thereon, a spindle coaxial with said magnet, a bell-shaped oscillatory member mounted on said spindle and encompassing the same and spaced therefrom, a magnetic reflux ring surrounding said bell-shaped member and radially spaced therefrom, an odometer train, gear means connecting said drive shaft to said odometer train and means for mounting all of said parts in the proper relation to each other, the improvement comprising a die-cast housing produced by injection molding having a side wall and a bottom, an integral bushing on said bottom for rotatably supporting said drive shaft and the magnet thereon, and an open end opposite to said bottom adapted to receive a dial, said housing having a plurality of seating surfaces therein integral with said housing and cast in the exact positions relative to each other to precisely three-dimensionally position parts of said speedometer in said housing, said mounting means for rotatably supporting said spindle and said bell-shaped oscillatory member being seated on some of said surfaces exactly coaxially with said drive shaft, said odometer train and said reflux ring being seated directly on other seating surfaces of said housing and in precisely positioned relation to said drive shaft and said bell-shaped member, respectively, whereby all of the elements of said speedometer may be individually and directly installed in said housing from said open side thereof without requiring any subsequent adjustment relative to each other, said supporting surfaces being formed by ribs on the inner wall of said housing extending upwardly from the bottom thereof, and cast integral with said wall and bottom, some of said ribs having locating studs thereon in exactly predetermined positions relative to each other, said studs receiving and precisely positioning said mounting means for rotatably supporting said spindle, some of said ribs having recesses forming bearing surfaces for directly supporting the odometer train and said reflux ring.

2. A speedometer including a die-cast housing as defined in claim 1, wherein the recesses in some of said ribs form bearing surfaces having upper edges adapted to be bent toward each other after said train has been inserted into said recesses to maintain said train therein.

3. A speedometer including a die-cast housing as defined in claim 1, wherein some of said recesses form wedge-shaped notches supporting said reflux ring, the projecting edges of said notches being bent to clamp said ring in a fixed position in said notches.

4. A speedometer including a die-cast housing as defined in claim 1, wherein the mounting means of said speedometer include bearing plates having bearing apertures therein for supporting the vertical spindle and also having mounting apertures therein, and wherein the ribs for supporting said bearing plates have said locating studs thereon engaging into and through said mounting apertures, said studs having apertures therein, the outer edge portions of said studs being bent outwardly over said bearing plates to secure said plates in a fixed position.

5. A speedometer including a die-cast housing as defined in claim 4, wherein said apertures in said studs extend into the stud-carrying ribs to receive screws for remounting said bearing plates on said studs after said bent-over outer edge portions of said studs have once been removed.

6. A magnetic speedometer for motor vehicles comprising a cup-shaped precision casting having a side wall and a bottom, a rotatable drive shaft with a magnet thereon, means including a bushing integral with said bottom at the center of the latter for rotatably supporting said drive shaft and said magnet, an elongated spindle with a bell-shaped member thereon encircling said magnet, bearing means engaging said elongated spindle at longitudinally spaced points therealong for supporting said spindle in precise coaxial alignment with said magnet and said drive shaft, said last-mentioned means including two bearing plates each having a bearing aperture therein through which said spindle extends, and precise complementary seating surfaces on each said bearing plate and said housing for maintaining said spindle in said coaxial alignment solely by abutting engagement of said complementary surfaces, said two bearing plates being provided at different levels in said casting, said seating surfaces comprising coplanar surfaces on said casting at each of said levels, each said bearing plate being positioned axially of said spindle by engagement with a plurality of said coplanar surfaces, each said bearing plate having apertures at said seating surfaces thereof and said coplanar surfaces having projecting studs fitting tightly within said apertures to precisely position the respective bearing plate transversely of said spindle.

7. A speedometer according to claim 6 further including a magnetic reflux ring surrounding said bell-shaped member and radially spaced therefrom, and seating means integral with said casting for precisely positioning said reflux ring with respect to said bell-shaped member, said seating means comprising ribs offset from said seating surfaces, said ribs comprising supporting portions engaging the bottom edge portion of said reflux ring, said supporting portions being disposed intermediate the upper and lower extremities of said ribs.

8. A speedometer according to claim 6 wherein said coplanar surfaces comprise a pair of surfaces for each plate at opposite sides of said casting, ribs integral with said casting, each said pair of surfaces and said studs being disposed on end portions of said ribs.

References Cited in the file of this patent
UNITED STATES PATENTS

| | | |
|---|---|---|
| 1,893,090 | Kreidler | Jan. 3, 1933 |
| 2,166,003 | Green | July 11, 1939 |
| 2,232,789 | Kollsman | Feb. 25, 1941 |
| 2,548,954 | Davis | Apr. 17, 1951 |